May 27, 1924.

F. C. RUPPEL 1,495,205

PROCESS FOR MAKING PLASTIC BODIES

Filed April 6, 1922

INVENTOR.
Frederick C. Ruppel
BY Edward N. Pagelsen
ATTORNEY.

Patented May 27, 1924.

1,495,205

UNITED STATES PATENT OFFICE.

FREDERICK C. RUPPEL, OF GRAND RAPIDS, MICHIGAN, ASSIGNOR TO HAYES-RUPPEL MANUFACTURING COMPANY, OF GRAND RAPIDS, MICHIGAN, A CORPORATION OF MICHIGAN.

PROCESS FOR MAKING PLASTIC BODIES.

Application filed April 6, 1922. Serial No. 550,187.

*To all whom it may concern:*

Be it known that I, FREDERICK C. RUPPEL, a citizen of the United States, and residing at Grand Rapids, in the county of Kent and State of Michigan, have invented a new and Improved Process for Making Plastic Bodies, of which the following is a specification.

Toilet seats and covers of the best types are usually made of wood, often of layers of wood veneer, which, in a highly finished condition without stain or varnish, are dipped into a solvent of nitro-cellulose such as ethyl acetate. A sheet of nitro-cellulose, usually called celluloid or pyralin, is soaked in such solvent sufficiently long to render it plastic and adhesive and this sheet is then pressed around the moist surface of the wood where it adheres. After drying and hardening the outer surface is finished and polished.

If the sheet is not sufficiently softened, its adhesion to the wood is imperfect and it becomes loose in time. If, on the other hand, it is softened too much, it expands too much, and while its adhesion to the wood is perfect, it is liable to crack upon shrinking or to cause the wood base to check or craze. The percentage of loss in the manufacture of such seats is high, not only by the loss caused by imperfect seats, but also because of the amount of nitro-cellulose which is scraped and cut away in finishing.

The present invention has for its object the production of a toilet seat, seat cover or other article having a surface layer of nitro-cellulose and a body of light plastic material of sufficient strength to resist the shocks to which the article may be exposed, and which can be produced at low cost.

A further object is to provide a product of this character which shall be a poor conductor of heat.

This invention consists in the process of forming bodies of plastic material within a trough of nitro-cellulose which process consists in molding the trough, filling it with plastic material, and then covering the exposed surface of the material within the trough with a layer of the same nitro-cellulose.

It further consists in forming the trough with an outwardly projecting circumferential flange and after softening the flange folding it in against the plastic material and then securing the covering sheet to this flange.

It also consists of the individual steps of the process as set forth in the claims.

Figure 1:
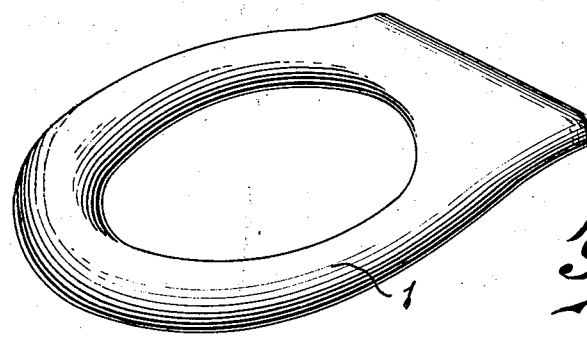
Figure 2:
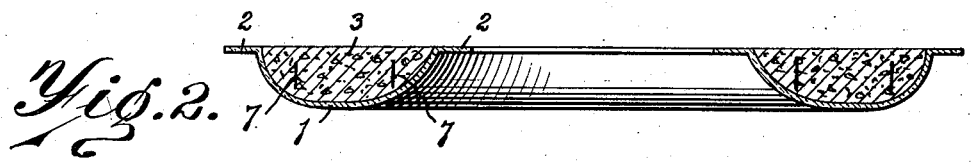
Figure 3:
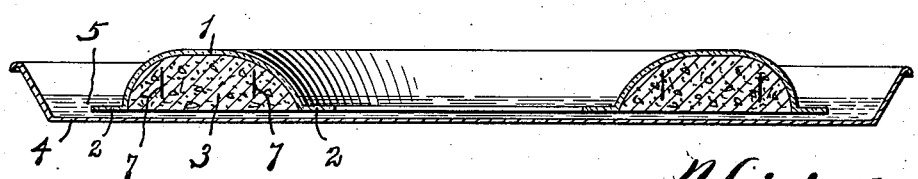
Figure 4:
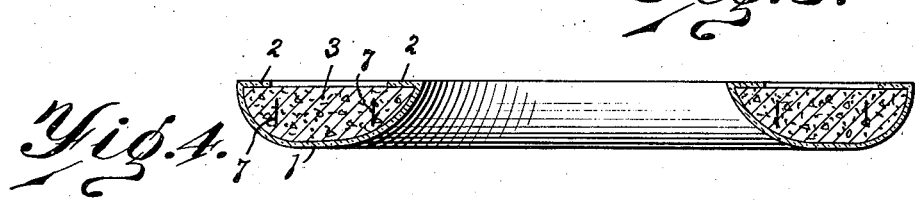
Figure 5:
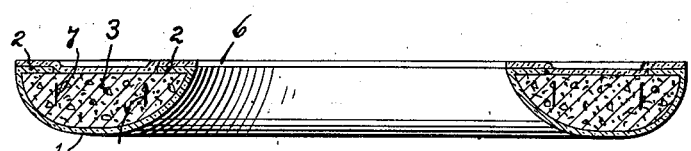
Figure 6:

As indicating the several steps of this process, Fig. 1 is a perspective view of a toilet seat constructed by my novel process. Fig. 2 is a vertical transverse section of the nitro-cellulose trough filled with the plastic material. Fig. 3 is a similar section of the filled trough dipped into a solvent for the nitro-cellulose. Fig. 4 is a section similar to Fig. 2 showing the marginal flange of the trough folded onto the plastic body. Fig. 5 is a similar section showing the cover sheet in position. Fig. 6 is a section of a plastic body enclosed in a trough of nitro-cellulose.

Similar reference characters refer to like parts throughout the several views.

While the present process is specifically described in connection with the manufacture of toilet seats, it will be obvious that it may be employed in the manufacture of plastic bodies of many different kinds, such as seat covers, drain boards, wash-stand tops and splash boards for sinks and washstands. While any desired plastic mass may be employed, I prefer to use a paste of the oxy-chloride of either zinc or magnesium into which is mixed an aggregate of ground wood or cork, preferably ground cork ranging gradually from cork flour to granules which just pass through a quarter-inch screen. The mass is thoroughly mixed to a thin mortar-like consistency, the proportions of the various sizes of the ground cork being such that the greatest amount of cork may be employed.

A sheet of nitro-cellulose properly cut is heated in water to softness and then pressed in a proper die to form the trough 1 shown in Fig. 2, the edges of the trough extending outwardly to form the flanges 2. The plastic mass 3 is then filled in, being struck off smooth with the top surfaces of the flanges. During this time the trough is preferably supported in a mold. After the plastic mass has set, the article thus far produced is inverted in a pan 4 containing a softener 5 for the nitro-cellulose which has no effect on the plastic mass 3. Ethyl acetate has been found satisfactory for this purpose.

The flanges 2 are then folded over onto the plastic body 3, the sheet 6, which has been previously prepared by the application of a similar solvent, is laid on the flanges 2, and pressure is applied to the finished article to hold the sheet 6 in position until it has united with the flanges 2 and the body 3. A portion of the sheet 6 will be depressed between the flanges 2 and against the body 3, but the distance it is depressed depends upon the thickness of the flanges. While in the softened condition, the flanges and the sheet 6 adhere to the mass 3 and remain attached thereto after hardening.

The plastic body 3 may be provided with reinforcing members 7 of any desired type which are embedded in the soft mass as it is being placed in the trough. Sheets of cellulose acetate or cellulose xanthate or of any other suitable material may be used in place of the cellulose-nitrate if desired.

Where the finished article is not subject to serious jars or blows, the trough 8 may be formed without flanges, as shown in Fig. 6, and, after the plastic body 9 has hardened and the edges of the trough 8 have been softened, a cover sheet 10 which has also been properly softened may be laid onto the flat side of the body 9 and held there under pressure until it united with the edges of the trough to form an integral cover for the plastic body.

The cork mixed into the oxy-chloride renders the plastic mass quite light and at the same time makes it a poor conductor of heat. As the trough is in normal condition and unaffected by the plastic mass while that is filled in, no stresses are set up in either during the hardening of the body. The stresses are slight in the cover sheets as these sheets need not be affected by the solvent to any extent in order to make them pliable enough to fit the flanges of the trough and the plastic body. The flanges themselves are so narrow that the stresses therein are of no consequence.

It will be understood that any inserts for attaching purposes may be incorporated in the plastic mass at the same time as the reinforcements, but as such work is well known, it is not illustrated. Finely divided vegetable fibres, asbestos fibres, mineral wool or similar reinforcements may be added to the plastic mass in order to give additional strength when deemed necessary. It may be said the resultant article is a plastic body veneered with a shell of plastic material adhering to the plastic body.

The details of this process and the character and proportions of the materials employed may all be changed by those skilled in the art without departing from the spirit of my invention as set forth in the following claims.

I claim:—

1. The process of producing a coated plastic body which consists in molding a plastic sheet into a trough, filling the trough with a plastic mass, softening the edges of the trough with a solvent, forming a cover sheet for the trough and softening with a solvent, and then pressing the cover sheet against the edges of the trough and against the plastic mass to cause a union between them.

2. The process of producing a plastic body veneered with a shell of plastic material which consists in forming the shell of two parts, filling the plastic mass into one of them, softening the contacting surfaces of the two parts with a solvent and then pressing such surfaces together.

3. The process of producing a coated plastic body which consists in forming a sheet of cellulose into a trough having outwardly turned edges, filling the trough with a paste of oxy-chloride in which ground cork has been stirred and with metal reinforcement, softening the flanges with a solvent after the paste has hardened and folding the flanges onto the hardened mass forming a sheet of cellulose and softening it with a solvent and then applying it to the flanges and hardened mass.

4. The process of producing a coated plastic body which consists in forming a sheet of cellulose into a trough having outwardly turned edges, filling the trough with a paste of oxy-chloride in which ground cork has been stirred and with metal reinforcement, softening the flanges with a solvent after the paste has hardened and folding the flanges onto the hardened mass forming a sheet of cellulose and softening it with a solvent and pressing the sheet against the folded-in flanges and the plastic mass until the solvent has evaporated.

FREDK. C. RUPPEL.